W. S. SMITH.
TOOL BOX.
APPLICATION FILED JULY 26, 1910.
1,026,059.
Patented May 14, 1912.
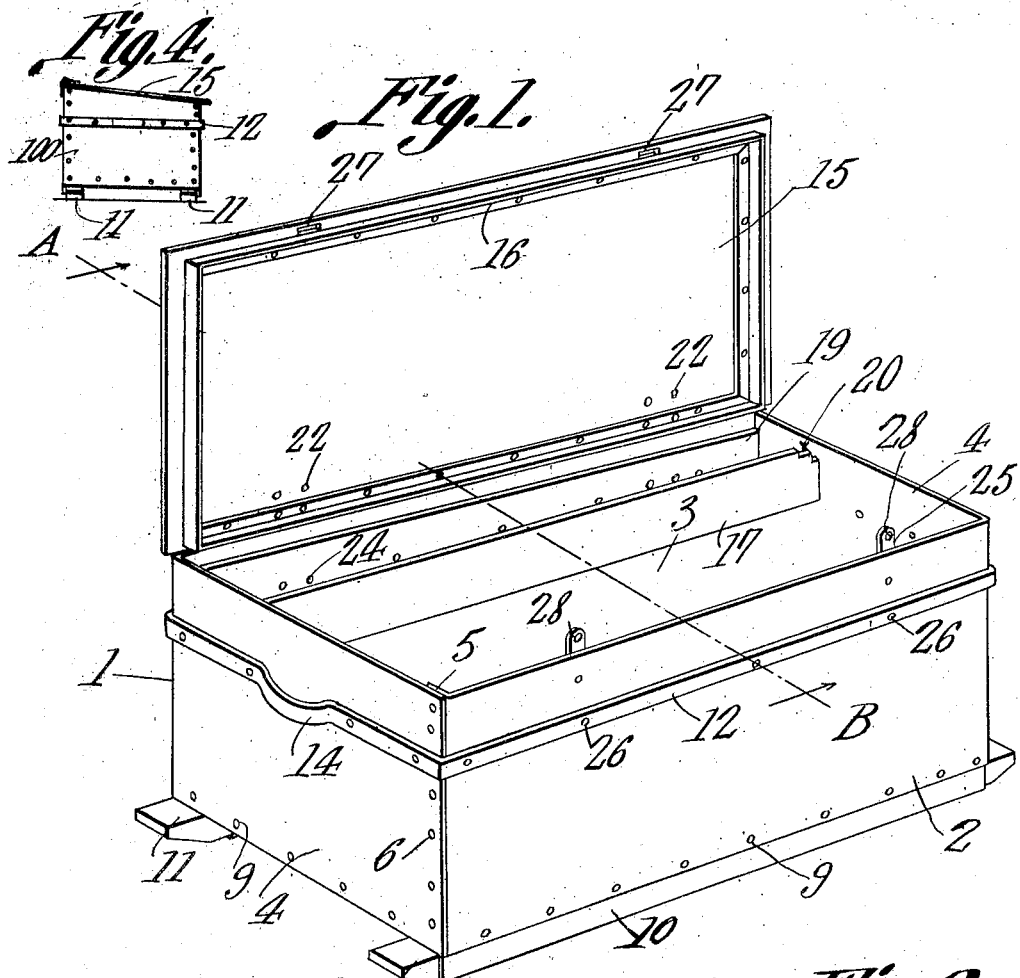
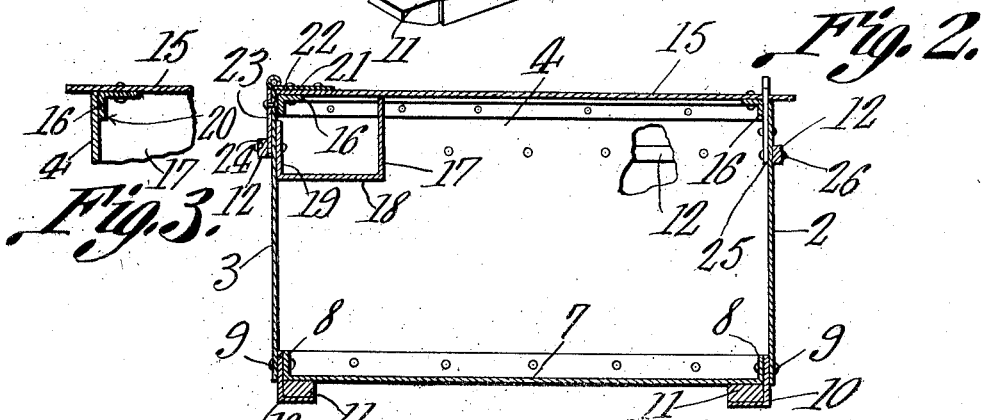
Witnesses
Washington S. Smith, Inventor
by C. A. Snow & Co.
Attorneys

UNITED STATES PATENT OFFICE.

WASHINGTON S. SMITH, OF PARKERSBURG, WEST VIRGINIA.

TOOL-BOX.

1,026,059.

Specification of Letters Patent. Patented May 14, 1912.

Application filed July 26, 1910. Serial No. 573,920.

*To all whom it may concern:*

Be it known that I, WASHINGTON S. SMITH, a citizen of the United States, residing at Parkersburg, in the county of Wood and State of West Virginia, have invented a new and useful Tool-Box, of which the following is a specification.

The device forming the subject matter of this application, is a box or chest, in which heavy tools are adapted to be deposited, the device being intended primarily, although not exclusively, to be employed for holding those tools which well drillers employ in the prosecution of their craft.

It is the object of this invention to provide a tool box which may readily be moved about from place to place upon suitable runners, and so to construct the box that a draft appliance of any sort may be assembled with the box to pull the same about.

Another object of the invention is to devise a tool box well adapted to withstand the severe strains incident to the moving operation above described.

Another object of the invention is to provide a novel means for locking the lid of the box in place, and to prevent the box from being tampered with.

Another object of the invention is to provide a tool box with a band adapted at once to serve as a means whereby the box may be drawn about, and to serve as an attaching element for many of the component elements of the tool box structure.

In the drawings, Figure 1 shows the invention in perspective; Fig. 2 is a transverse section upon line A—B of Fig. 1; Fig. 3 is a fragmental longitudinal section, the cutting plane being passed at right angles to the line A—B of Fig. 1; and Fig. 4 is an end elevation of a modification.

In carrying out the invention there is provided, as a primary and fundamental element, a box, denoted generally by the numeral 1. This box 1 may be fashioned in any desired manner, and from any chosen material. Preferably, however, the box 1 is fashioned from iron, a single piece of that metal being employed to form the front wall 2, the rear wall 3, and the end walls 4, the strip of metal from which the several walls 2, 3 and 4 are fashioned, being bent at one end, to form a flange 5, adapted to fit against the inner face of one of the end walls 4. By means of rivets 6 or other securing elements, the flange 5 may be connected with the end 4, as seen to best advantage in Fig. 1 of the drawings. The bottom 7 is bent upwardly, as shown at 8, about its periphery, to form a flange. This flange fits within the contour of the box, and is secured to the walls 2, 3 and 4, by means of rivets 9 or the like.

The runners upon which the box 1 rests may be fashioned in a variety of ways. For instance, if desired, angle members 10 may be provided, one flange of these angle members 10 being bound between the flanges 8 of the bottom 7 and the side walls 2 and 3, as seen most clearly in Fig. 2. The other flanges of the angle members 10 are disposed in parallel relation to the bottom 7, and are spaced at some distance below the same. Between these last named flanges and the bottom 7, bars 11, preferably, although not necessarily, of wood, may be mounted, and held in place in any desired manner.

The box 1 is surrounded, relatively near to its upper edge, by a band 12. Upon the end walls 4 of the box, the intermediate portions of the band 12 are outwardly bent, away from the end walls 4, as shown at 14. These outwardly bent portions 14 of the band 12 are adapted to serve as handles, whereby the tool box may be lifted about. Moreover, suitable draft rigging of any sort may be mounted in one of the portions 14 of the band 12, whereby the tool box may be drawn about, the runners fashioned by the elements 10 and 11, serving to engage the ground, to space the tool box proper against contact therewith. A lid 15 is provided, and this lid 15 carries upon its lower face a flange 16, fashioned from angle members. These angle members may be riveted, or otherwise secured, in one flange, to the lid 15, the other flange of each angle member depending. The flange 16 which is formed by the depending portions of the angle members, is adapted to fit within the walls 2, 3 and 4, relatively close to the said walls. When the lid of the box is closed, this flange 16 will prevent a wedge shaped tool from being introduced between the lid 15 and the upper edge of the box 1, to an extent sufficient to give enough leverage to pry the lid 15 open.

The invention further includes a tool-holding tray, preferably fashioned from a single piece of metal, and comprising a front wall 17, a bottom 18, and a rear wall 19.

This tray extends longitudinally of the tool box 1, the upper edge of the front wall 17 of the tray being notched, as shown at 20, to receive the flange 16 which depends from the lid 15.

The lid 15 is secured to the box 1 by means of hinges. By referring to Fig. 2 of the drawings, it will be seen that one member 21 of each hinge is secured by means of retaining elements 22 to the lid 15, and to the depending flange 16. The other member 23 of each hinge is secured by means of retaining elements 24 to the band 12, the rear wall 3 of the box, and to the rear wall 19 of the tray.

Bars 25 are disposed upon the inner face of the front wall 2 of the box, these bars being adapted to upstand slightly above the upper edge of the front wall 2, and to register in openings 27 in the lid 15. In the bars there are openings 28, disposed above the lid 15 when the lid is in closed position, and through these openings 28, locks, seals or the like, may be introduced. Retaining elements 26 serve to unite the band 12 with the front wall 2 of the box and with the bars 25.

It is to be noted that the hinges, the tray, and the bars 25 are all united with the band 12, this band 12, in addition to its function as a means for moving the box about, serving, likewise, as a reinforcing element, adapted to receive the retaining members whereby the several separable parts of the tool box are held together.

In fashioning the box, the band 12 is mounted in place about the box. By reason of the fact that the band extends entirely around the box, the rear wall 19 of the tray may be mounted either upon the wall 2 of the box, or upon the wall 3 thereof, the lid 15 being likewise hinged, either to the wall 2 or to the wall 3. The relative positions of the lid 15 and of the tray may therefore be shifted in the process of manufacture, the band 12 serving as a suitable attachment for the tray and for the hinges of the lid, in any case.

When the lid 15 is swung into closed position, not only is the body portion of the tool box closed, but, as well, the tray, consisting of the elements 17, 18 and 19, is likewise closed, so that any tools which may be therein, will not accidentally drop from the tray, it being noted that the front wall 17 is extended upwardly, relatively near to the upper edge of the tool box 1.

If desired, as shown in Fig. 4 the device may consist of a modified receptacle 100 upon which the lid 15 rests at an angle to the horizontal so as to shed water which may fall upon it.

Having thus described the invention, what is claimed is:—

A device of the class described comprising a box; a bottom for the box having a flange disposed parallel to the side wall of the box; an angle member having one flange engaged between the flange of the bottom and the side wall of the box, the other flange of the angle member being disposed below the bottom and approximately parallel to the bottom; and a bar transversely insertible between the last mentioned flange and the bottom, to reinforce the bottom, and to reinforce the last mentioned flange, whereby the same may serve as a runner, a band surrounding the box; securing elements extended through the band, through the wall of the box, and through the rear wall of the tray.

In testimony that I claim the foregoing as my own, I have hereto affixed my signature in the presence of two witnesses.

WASHINGTON S. SMITH.

Witnesses:
H. M. SPENCE,
F. M. KENNA.